(12) United States Patent
Khade et al.

(10) Patent No.: US 10,810,412 B2
(45) Date of Patent: Oct. 20, 2020

(54) METHOD, SYSTEM AND APPARATUS FOR GESTURE-BASED CONFIGURATION OF PAIRED SCANNER

(71) Applicant: Zebra Technologies Corporation, Lincolnshire, IL (US)

(72) Inventors: Deepak Dundappa Khade, Bangalore (IN); Seetharama Nayak, Bangalore (IN); Rakesh Rachappanavar Chandrappa, Bangalore (IN); Thomas Koch, Mississauga (CA); Steve W. Fantaske, Toronto (CA); Mandadapu Srilaxmi, Bangalore (IN); Mukesh Kumar, Bangalore (IN); Reo Lee, Richmond Hill (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/136,732

(22) Filed: Sep. 20, 2018

(65) Prior Publication Data
US 2020/0097705 A1    Mar. 26, 2020

(51) Int. Cl.
*G06K 9/00*        (2006.01)
*G06F 3/0488*    (2013.01)
*G06K 7/10*        (2006.01)

(52) U.S. Cl.
CPC ..... *G06K 9/00335* (2013.01); *G06F 3/04883* (2013.01); *G06K 7/10891* (2013.01)

(58) Field of Classification Search
CPC ............ G06K 9/00335; G06K 7/10891; G06F 3/04883
See application file for complete search history.

(56) References Cited

U.S. PATENT DOCUMENTS

| | | | | |
|---|---|---|---|---|
| 2006/0138232 A1* | 6/2006 | Hammerslag | ........ | G06K 7/0004 235/440 |
| 2008/0217411 A1* | 9/2008 | Ledwith | ............. | G06K 7/10881 235/472.02 |
| 2015/0268773 A1* | 9/2015 | Sanaullah | ............ | H04N 9/3179 345/168 |
| 2016/0179337 A1* | 6/2016 | Ballesteros | ......... | G06F 3/04817 715/773 |

OTHER PUBLICATIONS

RS6000 Ring Scanner User Guide, Configuring Motion and Proximity, pp. 106-112, Oct. 2017.

* cited by examiner

*Primary Examiner* — Stephen G Sherman

(57) ABSTRACT

A method for gesture-based configuration of a data capture device includes: storing, in a memory connected to a processor, a plurality of configuration definitions each defining (i) a gesture, and (ii) a corresponding configuration parameter; at a processor, monitoring an input device for a configuration activation input; responsive to detection of the configuration activation input, activating a configuration control mode at the processor; responsive to activation of the configuration control mode, detecting an input gesture at the processor; selecting one of the configuration definitions defining the gesture that matches the input gesture; updating a current configuration of the data capture device with the corresponding configuration parameter of the selected configuration definition.

15 Claims, 6 Drawing Sheets

METHOD, SYSTEM AND APPARATUS FOR GESTURE-BASED CONFIGURATION OF PAIRED SCANNER

BACKGROUND

Certain data capture devices, such as handheld barcode scanners, lack displays and include limited inputs. Such devices may nevertheless have a variety of configurable functions. Configuring such devices may therefore be a time-consuming an error-prone process, for example requiring the retrieval and scanning of specific barcodes encoding configuration changes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
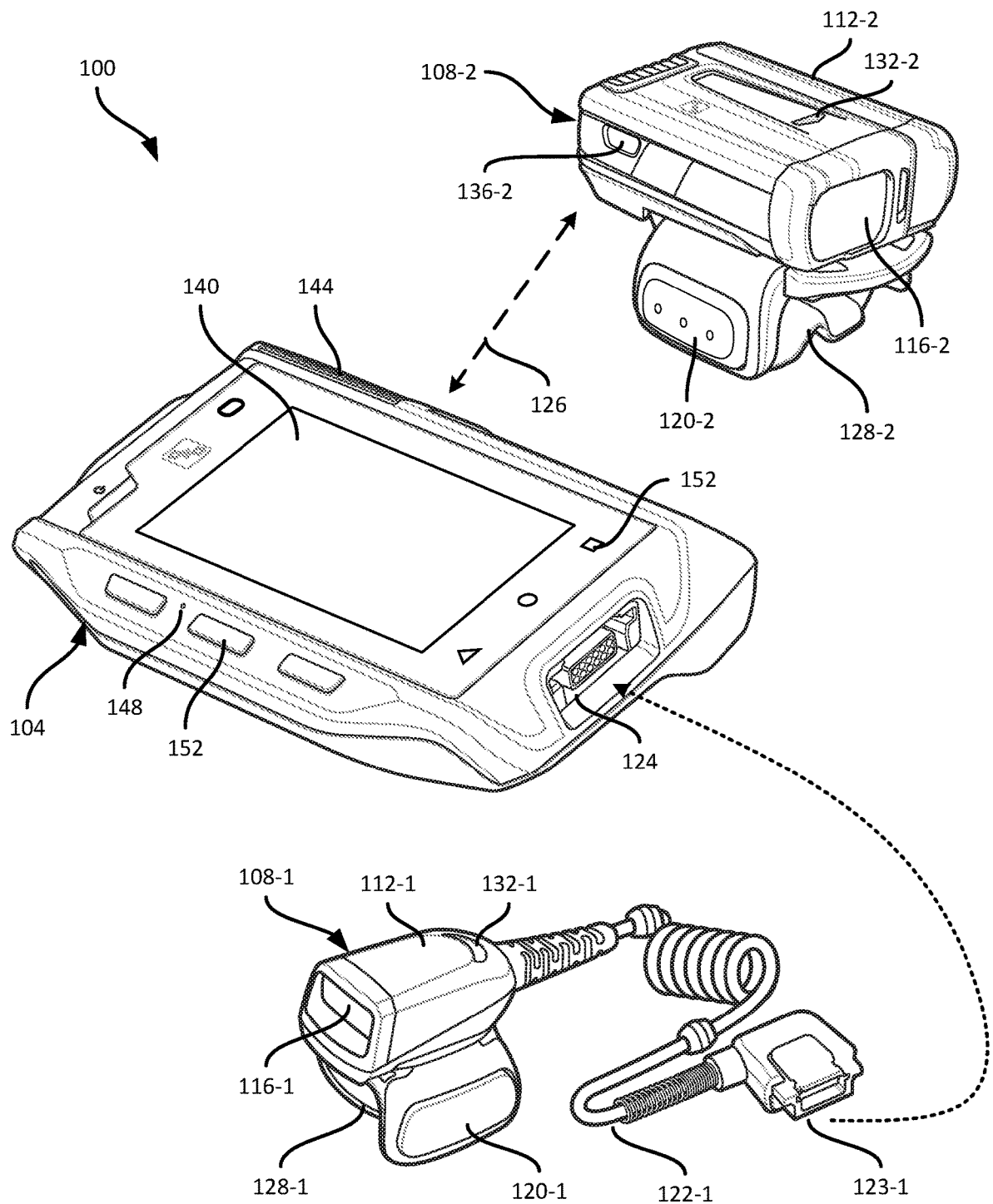
FIG. 1 illustrates a system including a computing device and data capture devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for gesture-based configuration of a data capture device, the method comprising: storing, in a memory connected to a processor, a plurality of configuration definitions each defining (i) a gesture, and (ii) a corresponding configuration parameter; at a processor, monitoring an input device for a configuration activation input; responsive to detection of the configuration activation input, activating a configuration control mode at the processor; responsive to activation of the configuration control mode, detecting an input gesture at the processor; selecting one of the configuration definitions defining the gesture that matches the input gesture; and updating a current configuration of the data capture device with the corresponding configuration parameter of the selected configuration definition.

Additional examples disclosed herein are directed to a system comprising: a mobile computer; and a data capture device external to the mobile computer and communicatively coupled with the mobile computer; the data capture device configured to capture data according to a current configuration and transmit the captured data to the mobile computer; a memory storing a plurality of configuration definitions for the data capture device, each configuration definition defining (i) a gesture, and (ii) a corresponding configuration parameter; a controller configured to detect a configuration activation input, and responsive to detection of the configuration activation input, to activate a configuration control mode at the controller; the controller further configured, responsive to activation of the configuration control mode, to detect an input gesture via a motion sensor coupled to the controller; the controller further configured to select one of the configuration definitions defining the gesture that matches the input gesture, and to update the current configuration of the data capture device with the corresponding configuration parameter of the selected configuration definition.

Further examples disclosed herein are directed to a mobile computer, comprising: a data capture module; a memory storing a plurality of configuration definitions for the data capture module, each configuration definition defining (i) a gesture, and (ii) a corresponding configuration parameter for the data capture module;

a motion sensor; a processor connected to the memory, the data capture module and the motion sensor; the processor configured to detect a configuration activation input and responsive to detection of the configuration activation input, to activate a configuration control mode; the processor further configured, responsive to activation of the configuration control mode, to monitor the motion sensor to detect an input gesture; the processor further configured to select one of the configuration definitions defining the gesture that matches the input gesture; the processor further configured to update a current configuration of the data capture module with the corresponding configuration parameter of the selected configuration definition.

FIG. 1 depicts a system 100 including a computing device, which in the illustrated embodiment is a mobile computer 104. The mobile computer 104 is illustrated as a wearable computer (e.g. a wrist-mounted computer). In other embodiments, however, the mobile computer 104 can have another suitable form-factor, including that of a smart phone, a laptop computer, a tablet computer, or the like. In further embodiments, the computing device need not be mobile. That is, the mobile computer 104 can be replaced with a desktop computer or the like.

The system 100 also includes at least one data capture device 108. In the present example, two data capture devices 108-1 and 108-2 (collectively referred to as data capture devices 108, and generically referred to as a data capture device 108—this nomenclature also employed for other components herein). The data capture devices 108 are configured to obtain data from machine-readable indicia such as barcodes affixed to objects such as packages. (not shown). The data capture devices 108 are therefore also referred to as scanners 108. Each scanner 108 includes a housing 112-1, 112-2 supporting a data capture assembly, of which an imaging window 116-1, 116-2 is shown. The imaging windows 116 permit the entry of light into the housing 112 for capture by an imaging sensor. The windows 116 also permit the emission of light, such as one or more lines of laser light, from the housing 112. In other words, the scanners 108 can implemented any suitable barcode-scanning technology, including both laser-based and image-based.

Each scanner 108 also includes a trigger input, such as a trigger button 120-1, 120-2. Depression of the trigger button 120 causes the scanner 108 to initiate a capture process, and to decode data from an indicium captured during the capture process. The decoded data is transmitted by the scanner 108 to the mobile computer 104. In particular, the scanner 108-1 includes a connector cable 122-1 and a connector 123-1 configured to connect to the mobile computer 104 via a port 124 to establish a wired communications link with the mobile computer 104. The scanner 108-2 includes a wireless communications interface (not shown in FIG. 1) configured to establish a wireless communications link 126 with the mobile computer 104.

The scanners 108 are shown in the illustrated embodiment as hand-worn scanners, for example include straps 128-1, 128-2 for securing the respective scanners 108 to a hand (e.g. one or more fingers) of an operator (not shown). In other examples, the straps 128 can be omitted, and the scanners 108 can include handles, clips or the like. The scanners 108 also include, in the illustrated embodiment, indicator output devices, such as indicator lights 132-1, 132-2 (e.g. one or more light-emitting diode (LED)). In other embodiments, the scanners 108 can include other indicator output devices in addition to or instead of the lights 132, such as speakers, haptic feedback devices (e.g. a motor for vibrating the housing 112). Further, in some embodiments the scanners 108 can include additional input devices, such as a key 136-2 shown on the scanner 108-2. The scanner 108-1 does not include a key 136 in the illustrated embodiment, although in other embodiments the scanner 108-1 may also include a key 136.

The scanners 108 are configurable according to a plurality of configuration parameters that determine the scanning behavior of the scanners 108, as well as power state, operational modes, and the like. For example, a configuration parameter may control which one or subset of a set of supported barcode symbologies a scanner 108 is currently configured to capture. As illustrated in FIG. 1, the scanners 108 lack displays and include relatively limited inputs (e.g. the buttons 120 and 136-2) in comparison to the mobile computer 104, which includes output devices in the form of a display 140 and a speaker 144 as well as inputs in the form of a microphone 148 and a plurality of buttons 152.

The above-mentioned output and input devices of the mobile computer 104 may be employed to configure the scanners 108. However, as will be discussed in greater detail below, the mobile computer 104 and the scanners 108 are also configured to implement gesture-based configuration of the scanners 108, in which either the mobile computer 104 or the scanner 108 detects a gesture and updates a corresponding configuration parameter at the scanner 108.

Figure 2A:
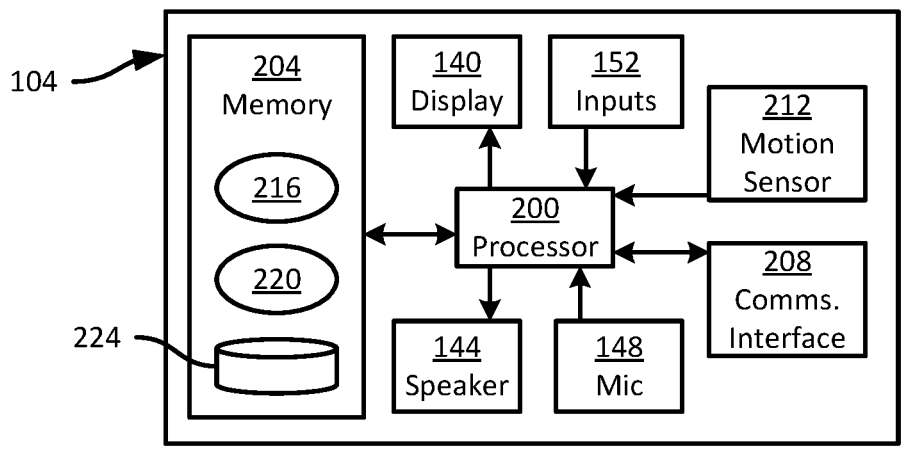
FIGS. 2A, 2B and 2C are block diagrams of certain internal hardware components of the computing device and the data capture devices of FIG. 1.
Figure 2B:
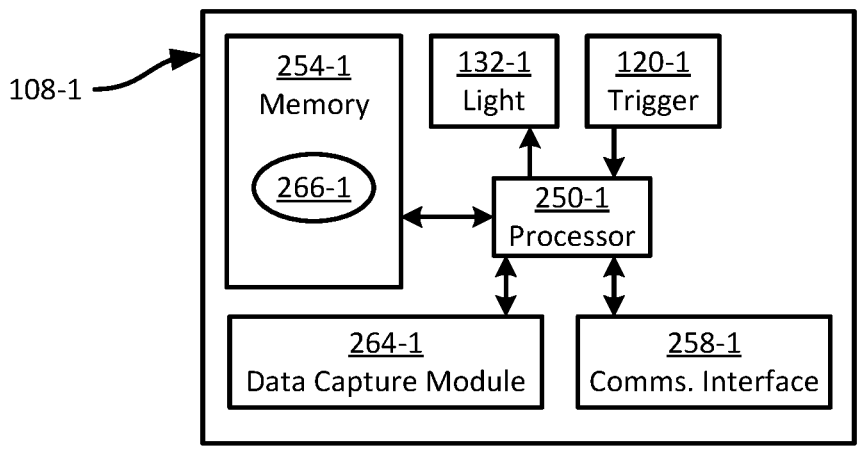
Figure 2C:
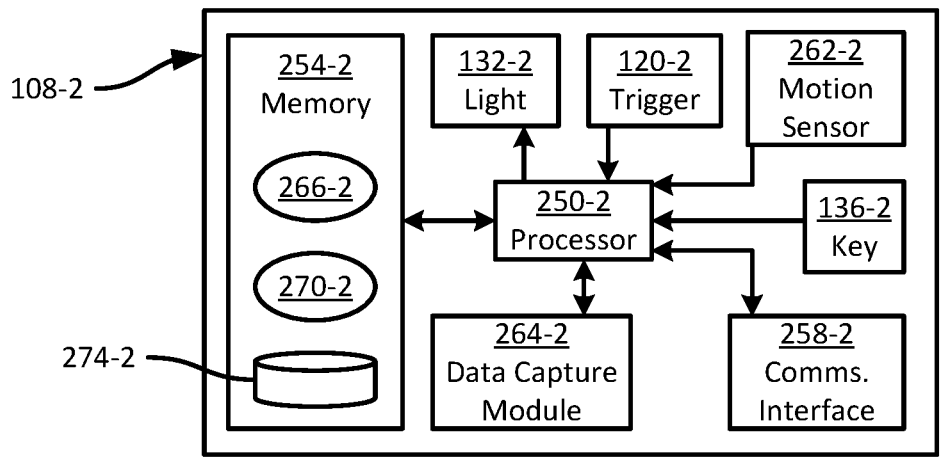

Turning to FIGS. 2A-2C, before a discussion of the functionality implemented by the mobile computer 104 and the scanners 108, certain internal components of the mobile computer 104 and the scanners 108-1 and 108-2 will be discussed.

Referring to FIG. 2A, the mobile computer 104 includes a central processing unit (CPU), also referred to as a processor 200, interconnected with a non-transitory computer readable storage medium, such as a memory 204. The memory 204 includes a suitable combination of volatile memory (e.g. Random Access Memory (RAM)) and non-volatile memory (e.g. read only memory (ROM), Electrically Erasable Programmable Read Only Memory (EE-PROM), flash). The processor 200 and the memory 204 each comprise one or more integrated circuits (ICs).

The components of the mobile computer 104 shown in FIG. 1 (e.g. the display 150, speaker 144, microphone 148 and inputs 152) are interconnected with the processor 200 via one or more communication buses. The mobile computer 104 also includes a communications interface 208 enabling the mobile computer 104 to exchange data with other devices, including the scanner 108-1 and the scanner 108-2. The communications interface 208 therefore includes any suitable hardware (e.g. transmitters, receivers, network interface controllers and the like) allowing the device 104 to communicate with such devices. The communications interface 208 is therefore also connected to the port 124. In some embodiments, distinct interfaces (rather than a single interface 208 as shown in FIG. 2A) may be employed to establish wired and wireless connections with other devices.

The mobile computer 104 further includes a motion sensor 212. The motion sensor 212 includes, for example, an inertial measurement unit (IMU) including one or more accelerometers and one or more gyroscopes. The motion sensor 212 is configured to detect acceleration of the mobile computer 104 (indicating movement) as well as changes in orientation of the mobile computer 104, and to transmit data indicating such movement and orientation to the processor 200.

The components of the mobile computer 104 are interconnected by the above-mentioned communication buses, and powered by a battery or other power source, over the communication buses or by distinct power buses (not shown).

The memory 204 stores a plurality of applications, each including a plurality of computer readable instructions executable by the processor 200. The execution of the above-mentioned instructions by the processor 200 causes the mobile computer 104 to implement certain functionality, as discussed herein. The applications are therefore said to be configured to perform that functionality in the discussion below. In the present example, the memory 204 of the mobile computer 104 stores a scanner host application 216, also referred to herein as the application 216. The mobile computer 104 is configured, via execution of the application 216 by the processor 200, to establish communications with a scanner 108, as well as to receive (e.g. for further processing, transmission to a server, presentation on the display 140, or the like) decoded data extracted by the scanner 108 from indicia such as barcodes.

The memory 204 also stores a scanner configuration control application 220, also referred to herein as the application 220. The mobile computer 104 is configured, via execution of the application 220, to process data from the motion sensor 212 to detect predefined gestures, and to generate updated configuration parameters for transmission to a connected scanner 108 according to the detected gesture(s). In other words, the application 220 is configured to alter the configuration of a scanner 108 connected to the mobile computer 104. The predefined gestures, and corresponding configuration updates, are stored in a configuration definitions repository 224, the contents of which will be discussed in greater detail below.

In some embodiments, the applications 216 and 220 are combined. For example, the application 220 can be implemented as a component of the application 216. In further embodiments, the processor 200, as configured by the execution of the applications 216 and 220, is implemented as one or more specifically-configured hardware elements, such as field-programmable gate arrays (FPGAs) and/or application-specific integrated circuits (ASICs).

Referring to FIG. 2B, the scanner 108-1 includes a central processing unit (CPU), also referred to as a processor 250-1, interconnected with a non-transitory computer readable storage medium, such as a memory 254-1. The memory 254-1 includes a suitable combination of volatile memory (e.g. Random Access Memory (RAM)) and non-volatile memory (e.g. read only memory (ROM), Electrically Erasable Programmable Read Only Memory (EEPROM), flash). The processor 250-1 and the memory 254-1 each comprise one or more integrated circuits (ICs).

The components of the scanner 108-1 shown in FIG. 1 (e.g. the trigger 120-1 and the light 132-1) are interconnected with the processor 250-1 via one or more communication buses. The scanner 108-1 also includes a communications interface 258-1 enabling the scanner 108-1 to exchange data with other devices, including the mobile computer 104. The communications interface 258-1 includes, in the illustrated embodiment, suitable hardware (e.g. network interface controllers, input/output pins and the like) allowing the scanner 108-1 to communicate with the mobile computer 104 via the cable 122-1 and the connector 123-1. In other embodiments, the interface 258-1 can be a wireless interface rather than a wired interface, and the cable 122-1 and connector 123-1 can be replaced by one or more wireless transceiver assemblies (not shown).

The scanner 108-1 also includes a data capture module 264-1 configured to capture indicia (e.g. 1D or 2D barcodes) and provide the indicia, or data decoded from the indicia, to the processor 250-1 for transmission to the mobile computer 104. The data capture module 264-1, in the present example, is a barcode scanning assembly and therefore includes one or more of a laser-based barcode scanner, a digital image sensor and the like. In other examples, the indicia may include radio frequency-based tags such as near field communication (NFC) tags or radio-frequency identification (RFID) tags. In such embodiments, the data capture module 264-1 includes one or more RFID transceiver assemblies for interrogating the above-mentioned tags.

The components of the scanner 108-1 are interconnected by communication buses, and powered by a battery or other power source, over the above-mentioned communication buses or by distinct power buses (not shown).

The memory 254-1 of the scanner 108-1 stores a plurality of applications, each including a plurality of computer readable instructions executable by the processor 250-1. The execution of the above-mentioned instructions by the processor 250-1 causes the scanner 108-1 to implement certain functionality, as discussed herein. The applications are therefore said to be configured to perform that functionality in the discussion below. In the present example, the memory 254-1 of the scanner 108-1 stores a scanning application 266-1, also referred to herein as the application 266-1. The scanner 108-1 is configured, via execution of the application 266-1 by the processor 250-1, to control the data capture module 264-1 according to a set of configuration parameters (e.g. stored with the application 266-1) to capture indicia such as barcodes, and to transmit data extracted from the captured indicia to the mobile computer 104.

In other examples, the processor 250-1, as configured by the execution of the application 266-1, is implemented as one or more specifically-configured hardware elements, such as field-programmable gate arrays (FPGAs) and/or application-specific integrated circuits (ASICs).

Turning to FIG. 2C, the scanner 108-2 includes a processor 250-2 interconnected with a memory 254-2 as described above in connection with the scanner 108-1. The scanner 108-2 also includes a communications interface 258-2, which in the present embodiment enables wireless communication with the mobile computer 104. For example, the interface 258-2 can include one or more wireless transceivers implementing a wireless communications standard such as Bluetooth™ or the like. In other embodiments, the interface 258-2 can be a wired interface, enabling the scanner 108-2 to communicate with the mobile computer 104 via a cable and a connector as discussed in connection with the scanner 108-1.

The scanner 108-2 also includes a motion sensor 262-2 including, for example, an inertial measurement unit (IMU) including one or more accelerometers and one or more gyroscopes. The motion sensor 262-2 is configured to detect acceleration of the scanner 108-2 (indicating movement) as well as changes in orientation of the scanner 108-2, and to transmit data indicating such movement and orientation to the processor 250-2. The scanner 108-2 further includes a data capture module 264-2, configured to capture and decode indicia such as barcodes (as discussed above in connection with the data capture module 264-1).

The memory 254-2 of the scanner 108-2 stores a plurality of applications, each including a plurality of computer readable instructions executable by the processor 250-2. The execution of the above-mentioned instructions by the processor 250-2 causes the scanner 108-2 to implement certain functionality, as discussed herein. The applications are therefore said to be configured to perform that functionality in the discussion below. In the present example, the memory 254-2 of the scanner 108-2 stores a scanning application 266-2, also referred to herein as the application 266-2. The scanner 108-2 is configured, via execution of the application 266-2 by the processor 250-2, to control the data capture module 264-2 according to a set of configuration parameters (e.g. stored with the application 266-2) to capture indicia such as barcodes, and to transmit data extracted from the captured indicia to the mobile computer 104.

The memory 254-2 also stores a scanner configuration control application 270-2, also referred to herein as the application 270-2. The scanner 108-2 is configured, via execution of the application 270-2, to process data from the motion sensor 262-2 to detect predefined gestures, and to generate updated configuration parameters for the application 266-2 according to the detected gesture(s). The predefined gestures, and corresponding configuration updates, are stored in a configuration definitions repository 274-2, the contents of which will be discussed in greater detail below.

As will now be apparent, the scanner 108-2 has motion-sensing capability and is therefore enabled to detect gestures and updated the configuration of the application 266-2 according to the repository 274-2. The scanner 108-1, on the other hand, lacks motion sensing capability and therefore also lacks a repository of predefined gestures and corresponding configuration parameters. As will be discussed below, the mobile computer 104 is therefore configured to deploy updated configuration parameters to the scanners 108 based on the capabilities of the scanners 108, effectively enabling or disabling the functionality of the application 220 according to which scanner 108 is currently connected to the mobile computer 104.

Figure 3:
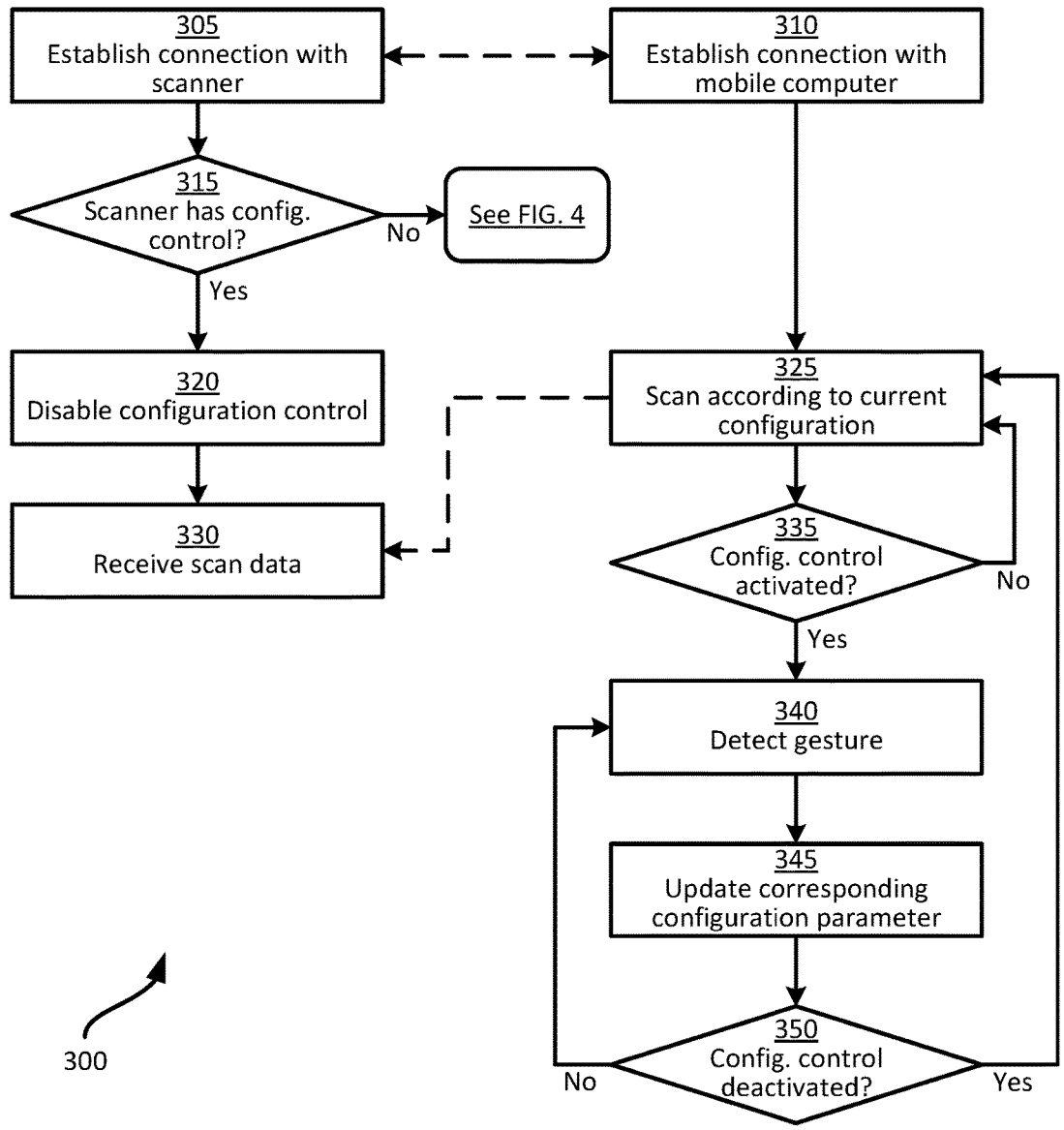
FIG. 3 is a flowchart of a method for gesture-based scanner configuration.

Turning to FIG. 3, a method 300 of gesture-based scanner configuration is illustrated. The method 300 will be described in conjunction with its performance in the system 100. In particular, as indicated in FIG. 3, certain blocks of the method 300 are performed by the mobile computer 104, while other blocks of the method 300 are performed by a scanner 108 (specifically, the scanner 108-2).

At blocks 305 and 310 the mobile computer 104 and the scanner 108-2 are configured to establish a connection with each other, such as the wireless communications link 126 (e.g. a Bluetooth™ link) shown in FIG. 1. At block 315, the mobile computer 104 is configured to determine whether the scanner with which a connection was established at block 305 (i.e. the scanner 108-2, in this example performance of the method 300) is enabled to control its own configuration parameters. In other words, the mobile computer 104 is configured to determine whether the scanner 108-2 includes a configuration control application. The determination at block 315 can include requesting data indicating the presence or absence of a configuration control application from the scanner 108-2, consulting a database (e.g. in the memory 204) of scanners 108 and indications of configuration capabilities, or the like. In the present example, the determination at block 315 is affirmative, as the scanner 108-2 include the configuration control application 270-2. The mobile computer 104 therefore proceeds to block 320, and disables the configuration control application 220. As will be apparent in the discussion below, disabling the application 220 means that the mobile computer 104 will not generate updated configuration parameters for the scanner 108-2 according to gestures detected by the motion sensor 212. Instead, configuration control will be left to the scanner 108-2 itself.

At block 325, the scanner 108-2 is configured to scan (i.e. capture, decode and transmit indicia to the mobile computer 104) according to a current configuration stored in association with the application 266-2. The current configuration defines a plurality of configuration parameters, examples of which are discussed below in greater detail. The mobile computer 104 is configured to receive scan data from the scanner 108-2 (e.g. over the link 126) at block 330.

At block 335, the scanner 108-2 is configured, e.g. via execution of the application 266-2, whether a configuration control mode has been activated. The activation of a configuration control mode at the scanner 108-2 can be accomplished in a variety of ways. For example, depression of the key 136-2 (e.g. for a predefined time period, or in a predefined sequence, such as two consecutive presses) can cause an affirmative determination at block 335. Other examples of inputs causing an affirmative determination at block 335 include a predefined configuration initiation gesture (e.g. a movement of the scanner 108-2 tracing the character alpha ("α").

When the determination at block 335 is negative, the scanner 108-2 returns to block 325, and continues scanning according to the current configuration. When the determination at block 335 is affirmative, however, the scanner 108-2 is configured to execute the application 270-2, and proceeds to block 340. In other words, following an affirmative determination at block 335 the scanner 108-2 is configured to switch from a scanning mode to a configuration mode.

At block 340, in the configuration mode, via execution of the application 270-2 the processor 250-2 monitors data received from the motion sensor 262-2 for one of a plurality of predefined gestures. The predefined gestures are stored in the repository 274-2, and can be expressed therein in any suitable format. Each predefined gesture corresponds to a configuration parameter in the repository 274-2. If the scanner 108-2 detects a gesture that does not correspond to any of the predefined gestures in the repository 274-2, the processor 250-2 can be configured to generate an error signal, such as flashing the light 132-2 in a predetermined color (e.g. red), vibrating a haptic feedback motor (not shown) in a predefined pattern, playing an error tone over a speaker (not shown) or the like.

When one of the gestures defined in the repository 274-2 is detected at block 340, the scanner 108-2 proceeds to block 345. At block 345, the application 270-2 is configured to update a configuration parameter of the application 266-2 according to the gesture detected at block 340. The configuration parameter updated at block 345 is defined in the repository 274-2. An example repository 274-2 is shown below in Table 1.

TABLE 1

Example Repository 274-2

| Gesture | Configuration Parameter |
|---------|-------------------------|
| M | Scan mode: continuous |
| S | Scan mode: single |
| L | Pick list: toggle on/off |
| Z | Symbology: Code 39 |
| V | Symbology: QR Code |
| G | Initiate firmware update |
| U | Reboot |
| Ω | Debug mode: toggle on/off |
| ɛ | Connection mode: toggle 1/2/3 |

As shown above, the repository 274-2 contains a plurality of configuration definitions, illustrated as rows of the Table 1. Each configuration definition defines a predefined gesture, indicating a movement path traveled by the housing 112-2 of the scanner 108-2 and therefore detectable by the motion sensor 262-2. The example gestures shown above are presented for illustrative purposes only, and a wide variety of other gestures may be implemented in addition to or instead of those shown above (e.g. the gestures need not correspond to written characters). Each of the configuration definitions of the repository 274-2 also defines a corresponding configuration parameter. The configuration parameters may affect the operational behavior of the scanner 108-2 during scanning operations. For example, the first two records of Table 1 set a "scan mode" parameter to the value "continuous" and "single" respectively. A continuous scan mode, as will be apparent to those skilled in the art, causes the scanner 108-2 to automatically and continuously capture any indicia within the field of view of the window 116-2, without requiring actuation of the trigger 120-2. Single-scan mode, in contrast, causes the scanner 108-2 to perform a single capture operation in response to each actuation of the trigger 120-2.

Another example of operational behavior controlled by the configuration parameters includes the toggling (i.e. switching to the opposite of the currently active state) of a pick list mode. The pick list mode enables the scanner 108-2 to capture a specific indicium (e.g. a barcode) from a plurality of indicia within the field of view of the window 116-2 (e.g. by projecting an aiming dot into the field of view and selecting the indicium coinciding with the aiming dot). A further example of operational behavior controlled by the configuration parameters includes a selection of the barcode symbology to be captured and decoded by the scanner 108-2. For example, the gestures "Z" and "V", respectively, cause the scanner 108-2 to capture and decode one-dimensional barcodes (e.g. Code 39 and the like) and two-dimensional barcodes (e.g. PDF417, QR codes and the like).

The configuration parameters may also affect the power state or operational mode of the scanner 108-2. For example, the configuration definition containing the gesture "G"

places the scanner 108-2 in a firmware update mode, discussed below in greater detail. Other examples of power states and operational modes include a gesture causing the scanner 108-2 to reboot, a gesture causing the scanner 108-2 to enable a debugging mode in which events are logged to the memory 254-2 for subsequent review, and a gesture toggling the connection mode employed to establish the link 126 between several available modes (e.g. corresponding to different communication protocols). An example of such modes include a human interface device (HID) mode in which the scanner 108 is configured to emulate an input device of the mobile computer 104. Further examples of a connection mode include a serial synchronous interface (SSI) mode and a serial port profile (SPP) mode. In other embodiments, distinct gestures may be employed for each of the above-mentioned connection modes. For example, rather than a toggle between connection modes by repetition of the "□" gesture, three distinct gestures may be stored corresponding to the above-mentioned HID, SPP and SSI connection modes. Examples of such gestures are a phi character (φ), a sigma character (σ), and a lower-case "q" character, respectively.

At block 345, updating the configuration of the scanner 108-2 can include writing an updated configuration parameter (such as an active symbology indicator) to a store defined by the application 266-2. Updating the configuration of the scanner 108-2 can also include, for example in the case of operational mode or power state configuration changes, generating an instruction (via execution of the application 270-2) for processing by the processor 250-2 to cause the defined power state or operational mode change.

When the configuration of the scanner 108-2 is updated at block 345, the scanner 108-2 can also be configured to generate an output signal indicating the nature of the configuration change. For example, each configuration parameter can correspond to a predefined output signal such as a flashing of the light 132-2 in a predetermined color, sequence, frequency or the like. For example, toggling the pick list mode on can be signaled by flashing the light 132-2 green, while toggling the pick list mode off can be signaled by flashing the light 132-2 yellow. The output signals themselves may be defined in the repository 274-2, or in the application 266-2.

Following the performance of block 345, the performance of the method 300 proceeds to block 350, at which the scanner 108-2 is configured to determine whether the configuration mode activated at block 335 has been deactivated. Deactivation of the configuration mode can be caused by repeating the input that activated the configuration mode at block 335. Thus, for example, a subsequent actuation of the key 136-2 can result in an affirmative determination at block 350. In other examples, a distinct deactivation input is required to deactivate the configuration mode. For example, where the gesture "α" is employed to activate the configuration mode, a distinct gesture "β" can be employed to exit the configuration mode.

When the determination at block 350 is negative, monitoring of the motion sensor 262-2 for further configuration gestures continues at block 340. When the determination at block 350 is affirmative, however, the scanner 108-2 is configured to return to block 325 and continue capturing scan data according to the current scan configuration (which now incorporates any changes made through the performance of blocks 340 and 345).

Figure 4:
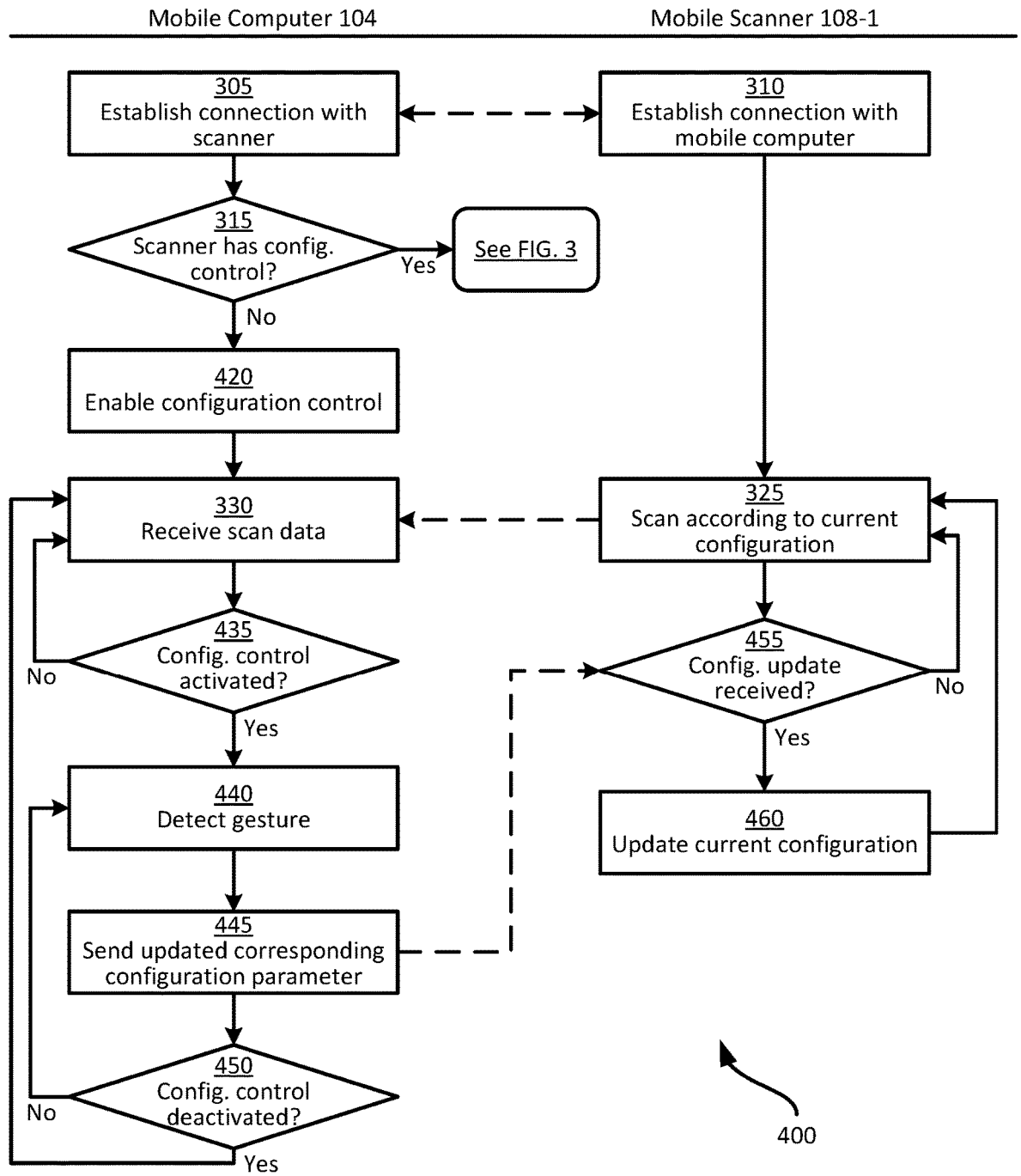
FIG. 4 is a flowchart of a method for gesture-based scanner configuration, according to another embodiment.

Turning now to FIG. 4, a method 400 of gesture-based scanner configuration is illustrated. The method 400 will be described in conjunction with its performance in the system 100. In particular, as indicated in FIG. 4, certain blocks of the method 400 are performed by the mobile computer 104, while other blocks of the method 300 are performed by a scanner 108 (specifically, the scanner 108-1). The blocks of the method 400 performed by the mobile computer 104 are an extension of the functionality of the mobile computer 104 shown in FIG. 3. Certain blocks of the method 400 are therefore also included in the method 300, as will be discussed below. In general, the method 400 illustrates functionality implemented at the mobile computer 104 when the connected scanner (e.g. the scanner 108-1 in this example) does not have a local configuration control mode, as well as functionality implemented by the scanner 108 itself under such conditions.

Blocks 305-315 are as described above in conjunction with the method 300. At block 315, however, responsive to a negative determination the mobile computer 104 is configured to proceed to block 420. At block 420, configuration control is enabled. That is, the mobile computer 104 is configured to enable execution of the configuration control application 220.

The scanner 108-1 is configured to obtain scan data for transmission to the mobile computer at block 325 (as discussed above), and the mobile computer 104 is configured to receive the scan data at block 330, as discussed above. At block 435, in contrast to the performance of method 300 described above in connection with FIG. 3, at block 435 the mobile computer 104 is configured to determine whether a configuration control mode has been activated. The determination at block 435 is as described above in conjunction with block 335 of the method 300, except that the determination is performed at the mobile computer 104 (by virtue of the enablement of configuration control at block 420). At block 435, the mobile computer 104 is configured to monitor the motion sensor 212 for data indicating an alpha ("α") gesture as noted above (that is, indicating that the housing of the mobile computer 104 has been moved to trace the shape of alpha character). In other embodiments, other activation inputs may be employed instead of, or in addition to, gesture inputs. For example combinations of key or button presses, selections of a scanner configuration option presented on the display 140 and the like, may be employed to activate the configuration control mode.

Following a negative determination at block 435, the mobile computer 104 is configured to return to block 330. When the determination at block 435 is affirmative, however, the mobile computer 104 proceeds to block 440. At block 440, as described above in connection with block 340, the mobile computer 104 is configured (via execution of the application 220) to monitor the motion sensor 212 for predefined gestures defined in the repository 224. Each record in the repository 224 also defines a corresponding configuration parameter for the connected scanner 108-1, as described in connection with the repository 274-2. Table 2 illustrates an example repository 224.

TABLE 2

Example Repository 224

| Gesture | Configuration Parameter |
|---|---|
| M | Scan mode: continuous |
| S | Scan mode: single |
| L | Pick list: toggle on/off |
| Z | Symbology: Code 39 |
| V | Symbology: QR Code |

TABLE 2-continued

Example Repository 224

| Gesture | Configuration Parameter |
|---|---|
| G | Initiate firmware update |
| U | Reboot |
| Ω | Debug mode: toggle on/off |
| W | Wake |
| P | Triggerless mode: toggle on/off |

As will be apparent from Table 2, the configuration parameters in the repository 224 need not mirror those in the repository 274-2, depending on the functionality of the scanner 108-1. For example, the connection mode parameter is omitted from Table 2, as the scanner 108-1 is presumed to support only a single connection mode with the mobile computer 104. In other examples, the repository 224 can also contain connection mode parameters such as those shown in Table 1. As a further example, an additional power state configuration parameter is shown in Table 2: detection of the gesture "W" causes the mobile computer to select the "wake" parameter for transmission to the scanner 108-1, to wake the scanner 108-1 from a low-power state. In other examples, the repository 274-2 of the scanner 108-2 can contain, in addition to or instead of the "wake" gesture, a gesture (e.g. a "ε" gesture) configured to cause the scanner 108-2 to re-establish a wireless connection with the mobile computer 104.

A further example configuration parameter shown in Table 2, but not present in the repository 274-2 of the scanner 108-2 is a toggle for a triggerless scan mode. When the triggerless scan mode is disabled, the scanner 108-1 is configured to conduct single or continuous scans according to the "scan mode" setting. When the triggerless scan mode is enabled, however, initiation of a scan operation is controlled by the mobile computer 104 itself rather than by the scanner 108-1. For example, when the triggerless mode is enabled, the mobile computer 104 is configured, via execution of the application 216, to monitor the motion sensor 212 for a predefined gesture to initiate a scan operation and send a scan command to the scanner 108-1. Inputs other than a gesture may also be employed at the mobile computer 104 to initiate a scan at the scanner 108-1 (e.g. button or key presses, audio inputs captured by the microphone 148 and the like).

At block 445, the mobile computer 104 is configured to transmit the updated configuration parameter corresponding to the gesture detected at block 440 to the scanner 108-1. The mobile computer 104 is then configured, at block 450, to determine whether the configuration control mode has been deactivated, for example via the mechanism discussed above in connection with block 350 of the method 300. When the determination at block 450 is negative, performance of the method 400 returns to block 440. When the determination at block 450 is affirmative, the mobile computer 104 returns to block 330.

At block 455, the scanner 108-1 is configured to determine whether one or more updated configuration parameters have been received from the mobile computer 104. When the determination at block 455 is negative, the scanner 108-1 continues to collect scan data according to the current configuration at block 325. When the determination at block 455 is affirmative, however, at block 460 the scanner 108-1 is configured to apply the updated configuration parameter(s) received from the mobile computer 104. For example, the scanner 108 can be configured to store operational parameters (e.g. which symbologies to decode, scan mode or the like) in association with the application 266-1 and return to block 325. When the configuration parameter(s) received from the mobile computer 104 include parameters causing the scanner 108-1 to change operational modes or power states (e.g. to transition from a low-power state to an active state, to reboot or the like), the scanner 108-1 is configured to execute the mode change or power state change specified by the configuration parameter. As discussed above in connection with block 345, the scanner 108-1 can also be configured to generate a signal indicating the configuration change at block 460.

Variations to the above systems and methods are contemplated. For example, in some embodiments, the performance of blocks 315 and 320 can be omitted. That is, the mobile computer 104 can be configured to enable configuration control regardless of whether the scanner 108 is also enabled with local configuration control. Thus, the scanner 108-2, in the illustrated embodiment, may update configuration parameters locally and also receive updated configuration parameters from the mobile computer 104.

In further embodiments, the scanner 108-2 may be configured to disconnect from the mobile computer 104 following a predetermined period of inactivity. At block 335, while monitoring for an input activating the local configuration control mode, the scanner 108-2 can also be configured to monitor the motion sensor 262-2 for any movement of the scanner 108-2 beyond a threshold, and in response to such movement, re-establish the link 126.

Figure 5:
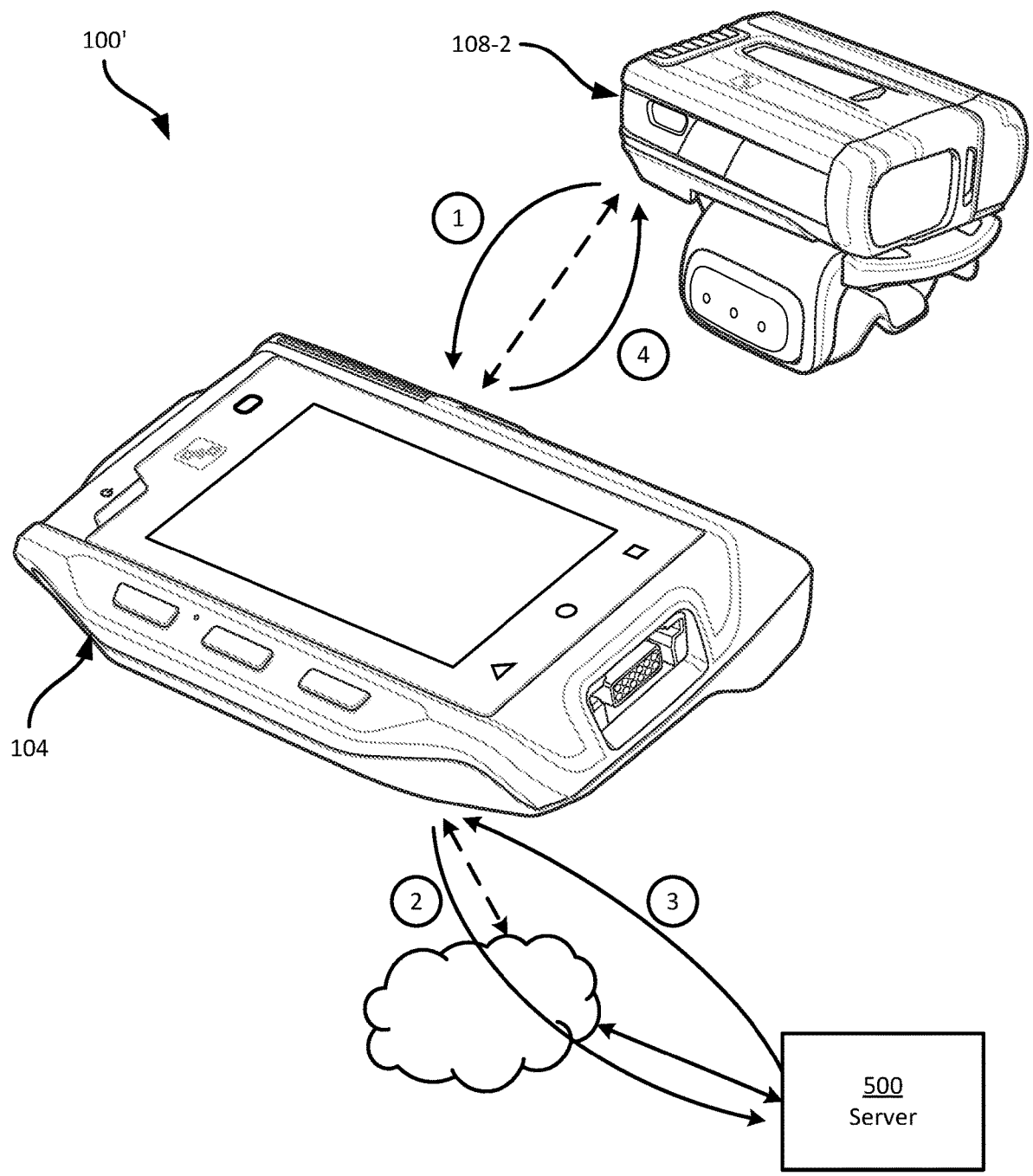
FIG. 5 illustrates updating firmware of a data capture device.

In some embodiments, updating a configuration parameter at the scanners 108 may require interaction with a further computing device. For example, if the firmware update gesture is detected at block 340 or 440, a process may be initiated by which the mobile computer 104 obtains updated firmware from a server and deploys the firmware to the scanner 108. Turning to FIG. 5, for example, a system 100' is illustrated, including the mobile computer 104 and the scanner 108-2 (the scanner 108-1 is not shown in FIG. 5), as well as a firmware server 500. Responsive to selection of the firmware configuration parameter at the scanner 108-2 at block 345, the scanner 108-2 can be configured to send a request "1" to the mobile computer via the link 126 for updated firmware. The request can include a current firmware version, an identifier of the scanner 108-2 and the like (alternatively, the mobile computer 104 can be configured to request such information from the scanner 108-2). The mobile computer 104 is then configured to request current firmware for the scanner 108-2 from the server 500, as indicated at "2". The server 500, responsive to the request from the mobile computer 104, is configured to retrieve and send the corresponding firmware ("3") to the mobile computer, for deployment to the scanner 108-2 ("4"). Various firmware update mechanisms may be deployed in connection with the system 100'. For example, an additional server (not shown) may be deployed to receive the initial request ("2") and return an indication, such as a URL, of the location of the current firmware for the scanner 108-2. The indication may point to the server 500, and the mobile computer 104 can therefore be configured to request the firmware from the server 500 using the indication.

Figure 6:
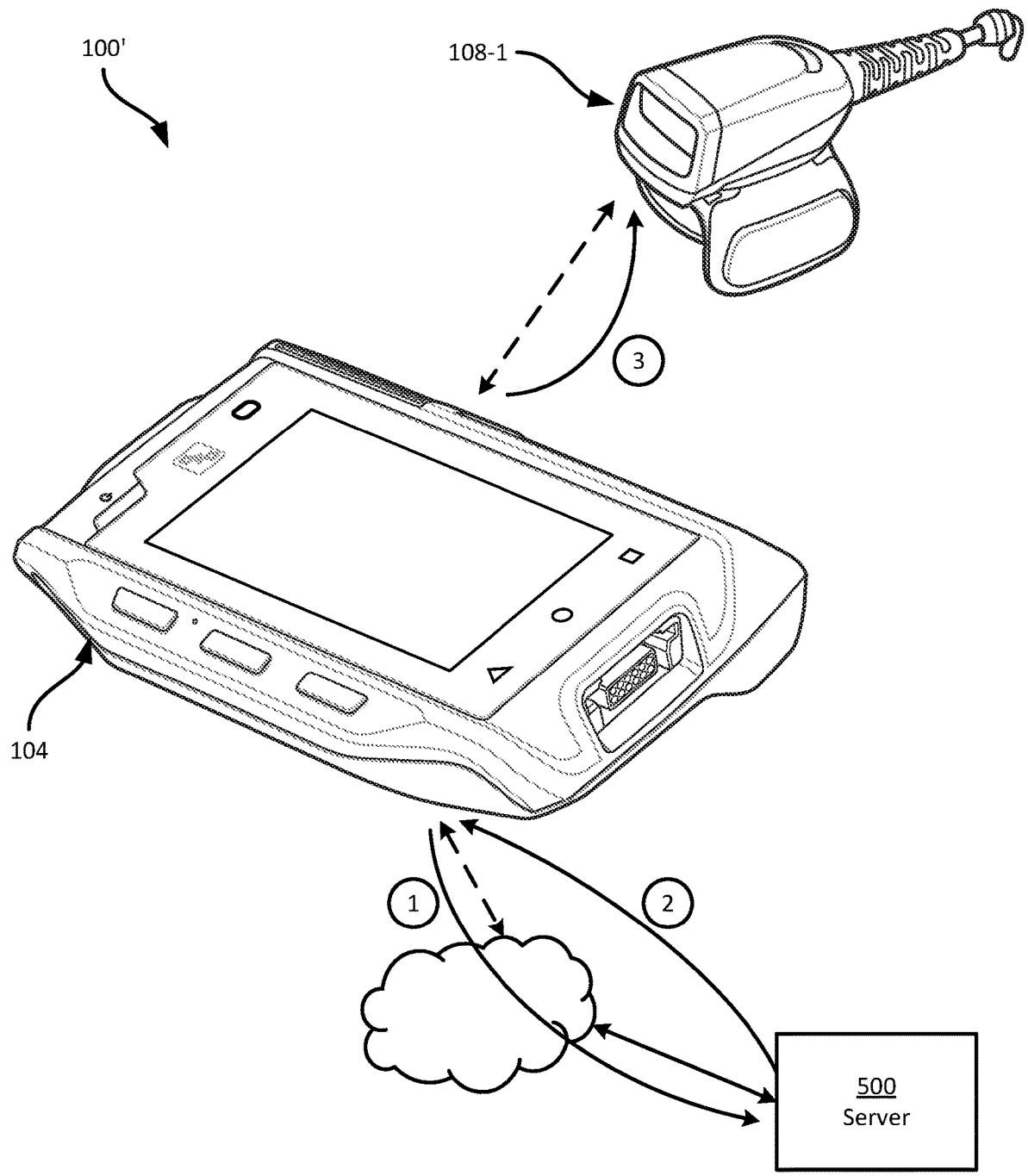
FIG. 6 illustrates updating firmware of a data capture device, according to another embodiment.

Turning to FIG. 6, the system 100' is shown in which the scanner 108-1 is connected to the mobile computer 104 rather than the scanner 108-2. As the scanner 108-1 is not enabled with local configuration control, the mobile computer 104 itself may initiate retrieval of the current firmware from the server 500 via the request "1", and receive the firmware ("2") for deployment to the scanner 108-1 ("3"). In other embodiments, the above-mentioned gesture recognition functionality may be deployed within the mobile computer 104 to update firmware at the mobile computer 104 itself, via interaction with the server 500 following detection of the relevant gesture at block 440.

In further examples, the scanners 108-1 and 108-2 can be omitted. The mobile computer 104 itself can include a data capture module 264, as well as a scanning application 266 as discussed above in connection with FIGS. 2B and 2C. The mobile computer 104 can therefore be configured to configure the data capture module according to motion data detected via the motion sensor 212. In such examples, blocks 305, 310 and 315 are omitted, and the mobile computer 104 performs each block of the remainder of the method 400 shown in FIG. 4. It will be understood that blocks 325 and 330, as well as blocks 445 and 455, no longer involve sending and receiving of data in such examples, as each pair of blocks is performed within the mobile computer 104.

In further examples, the scanner 108-2 can be configured to perform blocks 325-350 before establishing a connection with the mobile computer 104 at block 310. Such configuration functionality may be employed, for example, to configure the connection mechanism to be used at block 310 (e.g. to determine which connection mode will be used at block 310).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for gesture-based configuration of a data capture device, the method comprising:
   storing, in a memory connected to a processor, a plurality of configuration definitions each defining (i) a gesture, and (ii) a corresponding configuration parameter;
   at a processor, monitoring a motion sensor for a configuration activation input, the configuration activation input having an activation gesture that activates the configuration control mode, said configuration activation input detected via the motion sensor;

responsive to detection of the configuration activation input, activating a configuration control mode at the processor;

responsive to activation of the configuration control mode, detecting an input gesture at the processor;

selecting one of the configuration definitions defining the gesture that matches the input gesture; and updating a current configuration of the data capture device with the corresponding configuration parameter of the selected configuration definition, wherein:

the memory and the processor are components of a mobile computer external to the data capture device, and updating the current configuration of the data capture device comprises transmitting the corresponding configuration parameter of the selected configuration definition to the data capture device via a communications link.

2. The method of claim 1, further comprising:

responsive to detecting a further configuration activation input, deactivating the configuration control mode at the processor.

3. The method of claim 1, further comprising:

prior to monitoring the motion sensor, establishing the communications link between the data capture device and the mobile computer external to the data capture device.

4. The method of claim 3, further comprising:

subsequent to updating the current configuration, at the data capture device, capturing a machine-readable indicium according to the current configuration, and transmitting data decoded from the machine-readable indicium to the mobile computer.

5. The method of claim 1, further comprising:

at the processor, responsive to establishing the communications link and prior to monitoring the motion sensor, determining that the data capture device does not have a local configuration control mode.

6. The method of claim 1, wherein the configuration parameter defines one of an operational behavior, a power state, and an operational mode.

7. A system comprising:

a mobile computer; and a data capture device external to the mobile computer and communicatively coupled with the mobile computer; the data capture device configured to capture data according to a current configuration and transmit the captured data to the mobile computer;

a memory storing a plurality of configuration definitions for the data capture device, each configuration definition defining (i) a gesture, and (ii) a corresponding configuration parameter;

a controller configured to detect, via a motion sensor coupled to the controller, a configuration activation input, and responsive to detection of the configuration activation input, to activate a configuration control mode at the controller, the configuration activation input having an activation gesture that activates the configuration control mode;

the controller further configured, responsive to activation of the configuration control mode, to detect an input gesture via the motion sensor coupled to the controller; and the controller further configured to select one of the configuration definitions defining the gesture that matches the input gesture, and to update the current configuration of the data capture device with the corresponding configuration parameter of the selected configuration definition, wherein:

the controller comprises a processor of the mobile computer, and wherein the controller is further configured to transmit the corresponding configuration parameter of the selected configuration definition to the data capture device.

8. The system of claim 7, wherein the controller is further configured, responsive to detecting a further configuration activation input, to deactivate the configuration control mode.

9. The system of claim 7, further comprising an input device; wherein the controller is configured to detect the configuration activation input as input data received via the input device.

10. The system of claim 7, wherein the data capture device is further configured to establish a communications link with the mobile computer.

11. The system of claim 10, wherein the data capture device is further configured, subsequent to updating the current configuration, to capture a machine-readable indicium according to the current configuration, and to transmit data decoded from the machine-readable indicium to the mobile computer via the communications link.

12. A mobile computer, comprising:

a data capture module;

a memory storing a plurality of configuration definitions for the data capture module, each configuration definition defining (i) a gesture, and (ii) a corresponding configuration parameter for the data capture module;

a motion sensor;

a processor connected to the memory, the data capture module and the motion sensor, the processor configured to detect a configuration activation input and responsive to detection of the configuration activation input, to activate a configuration control mode, wherein the processor is configured to detect the configuration activation input, via the motion sensor, as an activation gesture that activates the configuration control mode;

the processor further configured, responsive to activation of the configuration control mode, to monitor the motion sensor to detect an input gesture;

the processor further configured to select one of the configuration definitions defining the gesture that matches the input gesture;

the processor further configured to update a current configuration of the data capture module with the corresponding configuration parameter of the selected configuration definition.

13. The mobile computer of claim 12, further comprising an input device; wherein the processor is configured to detect the configuration activation input as input data received via the input device.

14. The mobile computer of claim 12, wherein the processor is further configured, responsive to detecting a further configuration activation input, to deactivate the configuration control mode.

15. The mobile computer of claim 12, wherein the data capture module is configured, subsequent to updating the current configuration, to capture a machine-readable indicium according to the current configuration, and transmit data decoded from the machine-readable indicium to the processor.

* * * * *